US009063740B2

(12) United States Patent
Poulsen et al.

(10) Patent No.: US 9,063,740 B2
(45) Date of Patent: Jun. 23, 2015

(54) WEB WIDGET COMPONENT FOR A RAPID APPLICATION DEVELOPMENT TOOL

(75) Inventors: Tom Poulsen, Los Gatos, CA (US); Terence Munday, Menlo Park, CA (US); Trevor Mathers, Portland, OR (US); Manohar Golla, Vittal Nagar Godavarikhani (IN)

(73) Assignee: Oracle International Corporation, Redwood Shores, CA (US)

( * ) Notice: Subject to any disclaimer, the term of this patent is extended or adjusted under 35 U.S.C. 154(b) by 417 days.

(21) Appl. No.: 12/211,801

(22) Filed: Sep. 16, 2008

(65) Prior Publication Data

US 2010/0070886 A1 Mar. 18, 2010

(51) Int. Cl.
G06F 3/048 (2013.01)
G06F 9/44 (2006.01)
G06F 17/30 (2006.01)

(52) U.S. Cl.
CPC .............. *G06F 8/34* (2013.01); *G06F 17/3089* (2013.01); *G06F 17/30873* (2013.01); *G06F 9/4443* (2013.01)

(58) Field of Classification Search
CPC .. G06F 17/3089; G06F 17/30873; G06F 8/34
USPC .................. 715/760, 762, 764, 765
See application file for complete search history.

(56) References Cited

U.S. PATENT DOCUMENTS

| | | | |
|---|---|---|---|
| 7,546,543 B2 * | 6/2009 | Louch et al. | 715/762 |
| 7,707,514 B2 * | 4/2010 | Forstall et al. | 715/810 |
| 7,743,336 B2 * | 6/2010 | Louch et al. | 715/766 |
| 7,917,858 B2 | 3/2011 | Pereira et al. | |
| 8,015,491 B2 * | 9/2011 | Shaver et al. | 715/719 |
| 8,056,092 B2 | 11/2011 | Allen et al. | |
| 8,150,939 B1 | 4/2012 | Murray | |
| 8,166,071 B1 | 4/2012 | Korablev et al. | |
| 8,719,896 B2 | 5/2014 | Poulsen et al. | |
| 8,769,490 B2 | 7/2014 | Poulsen et al. | |
| 2001/0052108 A1 * | 12/2001 | Bowman-Amuah | 717/1 |
| 2002/0049603 A1 | 4/2002 | Mehra et al. | |
| 2002/0120859 A1 | 8/2002 | Lipkin et al. | |
| 2002/0138719 A1 | 9/2002 | Farkas et al. | |
| 2003/0051136 A1 | 3/2003 | Curtis et al. | |
| 2003/0061482 A1 * | 3/2003 | Emmerichs | 713/165 |
| 2003/0222918 A1 | 12/2003 | Coulhard | |
| 2004/0046789 A1 * | 3/2004 | Inanoria | 345/748 |
| 2004/0059587 A1 | 3/2004 | Astle et al. | |
| 2004/0111428 A1 * | 6/2004 | Rajan et al. | 707/102 |

(Continued)

OTHER PUBLICATIONS

U.S. Appl. No. 12/211,784, "Notice of Allowance", Jan. 7, 2014, 9 pages.

(Continued)

*Primary Examiner* — Anil Bhargava
(74) *Attorney, Agent, or Firm* — Kilpatrick, Townsend & Stockton

(57) ABSTRACT

A web widget component is provided for hosting web widgets. The web widget component may be added to an application or another user interaction environment via a rapid application development tool. Web widgets may be added to the web widget component by a designer of the component, a developer (i.e., a person utilizing the rapid application development tool to build the user interaction environment), or may be added by a user of the web widget component in a declarative manner. Security settings control access to web widgets, and an option to allow or restrict access to web widget display options in the component.

16 Claims, 6 Drawing Sheets

(56) References Cited

U.S. PATENT DOCUMENTS

| | | | |
|---|---|---|---|
| 2005/0010880 A1* | 1/2005 | Schubert et al. | 716/4 |
| 2005/0044423 A1 | 2/2005 | Mellmer et al. | |
| 2005/0177837 A1 | 8/2005 | Mensah et al. | |
| 2005/0193368 A1 | 9/2005 | Becker et al. | |
| 2006/0048225 A1 | 3/2006 | Gomez et al. | |
| 2006/0168536 A1 | 7/2006 | Portmann | |
| 2006/0277481 A1* | 12/2006 | Forstall et al. | 715/764 |
| 2007/0079383 A1 | 4/2007 | Gopalakrishnan | |
| 2007/0083378 A1 | 4/2007 | Guarraci et al. | |
| 2007/0101146 A1 | 5/2007 | Louch et al. | |
| 2007/0101433 A1 | 5/2007 | Louch et al. | |
| 2007/0288858 A1 | 12/2007 | Pereira et al. | |
| 2008/0034309 A1 | 2/2008 | Louch et al. | |
| 2008/0040426 A1 | 2/2008 | Synstelien et al. | |
| 2008/0052348 A1 | 2/2008 | Adler et al. | |
| 2008/0091952 A1 | 4/2008 | Sumner et al. | |
| 2008/0141141 A1 | 6/2008 | Moore et al. | |
| 2008/0141153 A1 | 6/2008 | Samson et al. | |
| 2008/0141341 A1 | 6/2008 | Vinogradov et al. | |
| 2008/0148283 A1 | 6/2008 | Allen et al. | |
| 2008/0195483 A1* | 8/2008 | Moore | 705/14 |
| 2008/0215879 A1 | 9/2008 | Williams et al. | |
| 2008/0215998 A1* | 9/2008 | Moore et al. | 715/762 |
| 2008/0222232 A1* | 9/2008 | Allen et al. | 709/201 |
| 2008/0222658 A1* | 9/2008 | Allen et al. | 719/320 |
| 2008/0244293 A1 | 10/2008 | Morris | |
| 2008/0255962 A1 | 10/2008 | Chang et al. | |
| 2008/0271127 A1 | 10/2008 | Naibo et al. | |
| 2008/0301460 A1 | 12/2008 | Miller et al. | |
| 2008/0307385 A1* | 12/2008 | Dreiling et al. | 717/108 |
| 2008/0320446 A1 | 12/2008 | Redpath | |
| 2008/0320466 A1 | 12/2008 | Dias | |
| 2009/0013310 A1* | 1/2009 | Arner et al. | 717/120 |
| 2009/0044138 A1* | 2/2009 | Rudolph et al. | 715/765 |
| 2009/0070692 A1* | 3/2009 | Dawes et al. | 715/764 |
| 2009/0077623 A1* | 3/2009 | Baum et al. | 726/1 |
| 2009/0077624 A1* | 3/2009 | Baum et al. | 726/1 |
| 2009/0172021 A1 | 7/2009 | Kane et al. | |
| 2009/0228838 A1* | 9/2009 | Ryan et al. | 715/853 |
| 2009/0235149 A1* | 9/2009 | Frohwein | 715/205 |
| 2009/0247134 A1 | 10/2009 | Jeide et al. | |
| 2009/0249282 A1 | 10/2009 | Meijer et al. | |
| 2009/0254745 A1 | 10/2009 | Ganesan | |
| 2009/0307609 A1* | 12/2009 | Ganz et al. | 715/753 |
| 2009/0313601 A1* | 12/2009 | Baird et al. | 717/106 |
| 2009/0320105 A1 | 12/2009 | Jurkiewicz et al. | |
| 2010/0070968 A1 | 3/2010 | Poulsen et al. | |
| 2010/0071026 A1 | 3/2010 | Poulsen et al. | |
| 2010/0114739 A1* | 5/2010 | Johnston | 705/27 |
| 2010/0299598 A1* | 11/2010 | Shin et al. | 715/702 |
| 2010/0305999 A1* | 12/2010 | Fujioka | 705/7 |

OTHER PUBLICATIONS

U.S. Appl. No. 12/211,795, "Notice of Allowance", Mar. 12, 2014, 7 pages.
U.S. Appl. No. 12/211,784, "Final Office Action", Sep. 20, 2011, 17 Pages.
U.S. Appl. No. 12/211,784, "Non-Final Office Action", Mar. 31, 2011, 12 pages.
U.S. Appl. No. 12/211,784, "Non-Final Office Action", Jun. 6, 2013, 16 pages.
U.S. Appl. No. 12/211,784, "Notice of Allowance", Nov. 25, 2013, 17 pages.
U.S. Appl. No. 12/211,784, "Office Action", Apr. 5, 2012, 14.
U.S. Appl. No. 12/211,784, "Office Action", Nov. 6, 2012, 16.
U.S. Appl. No. 12/211,795, "Non Final Office Action", Oct. 3, 2013, 27 pages.
U.S. Appl. No. 12/211,795, "Office Action", Jan. 24, 2012, 19.
U.S. Appl. No. 12/211,795, "Office Action", Jul. 6, 2012, 21.
U.S. Appl. No. 12/211,795, "Office Action", Feb. 4, 2013, pp. 23.
U.S. Appl. No. 12/211,795, "Office Action Response", Apr. 24, 2012, 18.
U.S. Appl. No. 12/211,795, "Notice of Allowance", May 23, 2014, 2 Pages.

* cited by examiner ent. The web widget component may be added to an
application or another user interaction environment via a
rapid application development tool, such as Oracle Interna-
tional Corporation's Application Development Framework.
Web widgets may be added to the web widget component by
a designer of the component, a developer (i.e., a person uti-
lizing the rapid application development tool to build the user
interaction environment), or may be added by a user of the
web widget component in a declarative manner.

WEB WIDGET COMPONENT FOR A RAPID APPLICATION DEVELOPMENT TOOL

BACKGROUND OF THE INVENTION

A desktop widget is a small specialized graphical user interface (GUI) application that provides some visual information and/or easy access to frequently used functions such as clocks, calendars, news aggregators, calculators and desktop notes. A widget engine is a software service available to users for running and displaying desktop widgets on the desktop of a computer.

Web widgets are different than desktop widgets. Web widgets run inside a web page and are also known as "modules," "gadgets," "capsules," "snippets," "minis," "flakes," or "badges." Web widgets allow a website developer to create a website by embedding content or tools from one site onto a page of another site. In contrast, a desktop widget is a desktop-based mini-application that shows discrete information, often connected to the Internet.

One of the most popular web widgets is Google Gadgets. Google Gadgets are miniature objects that provide dynamic content that may be placed on a web page. A Google Gadget is typically embedded within a page of HTML, i.e. a webpage, via embedding of a URL to the Google Gadget in the target webpage. The Google Gadget adds some content to that webpage that is not static.

Google Gadgets provide an XML/HTML/JavaScript solution to building web components that can be embedded in a webpage. These components, however, can only be utilized by someone with the knowledge, skills, and access to create and edit webpages, and to embed the Google Gadgets in those webpages.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description of some embodiments that are presented later.

In accordance with an embodiment, a web widget component is provided for hosting web widgets, such as Google Gadgets. The web widget component may be added to an application or another user interaction environment via a rapid application development tool, such as Oracle International Corporation's Application Development Framework. Web widgets may be added to the web widget component by a designer of the component, a developer (i.e., a person utilizing the rapid application development tool to build the user interaction environment), or may be added by a user of the web widget component in a declarative manner.

The rapid application development tool may be used to install the web widget component, for example, in a region of a user interaction environment, such as in an application or in a suite of user interactive applications, created by the rapid application development tool. Multiple options may be provided in terms of regions to provide the web widget component and how to display the web widget component. In addition, one or more selection devices, such as a drop down menu, may be provided to select particular web widgets for use and display. The web widget component may provide an option, such as a blank data field, for entering additional web widgets. These additional web widgets may or may not be allowed depending upon the privileges and/or security clearance of the user.

In accordance with an embodiment, an administrator may seed the web widget component with a specific web widget or a set of web widgets, and, if the administrator so chooses, may provide customization and preference options to users to manage their own desktop widgets. Different users may be presented with different sets of desktop widgets based upon their security clearance and/or profiles.

Other features of the invention will become apparent from the following detailed description when taken in conjunction with the drawings, in which:

DETAILED DESCRIPTION OF THE INVENTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Figure 1:
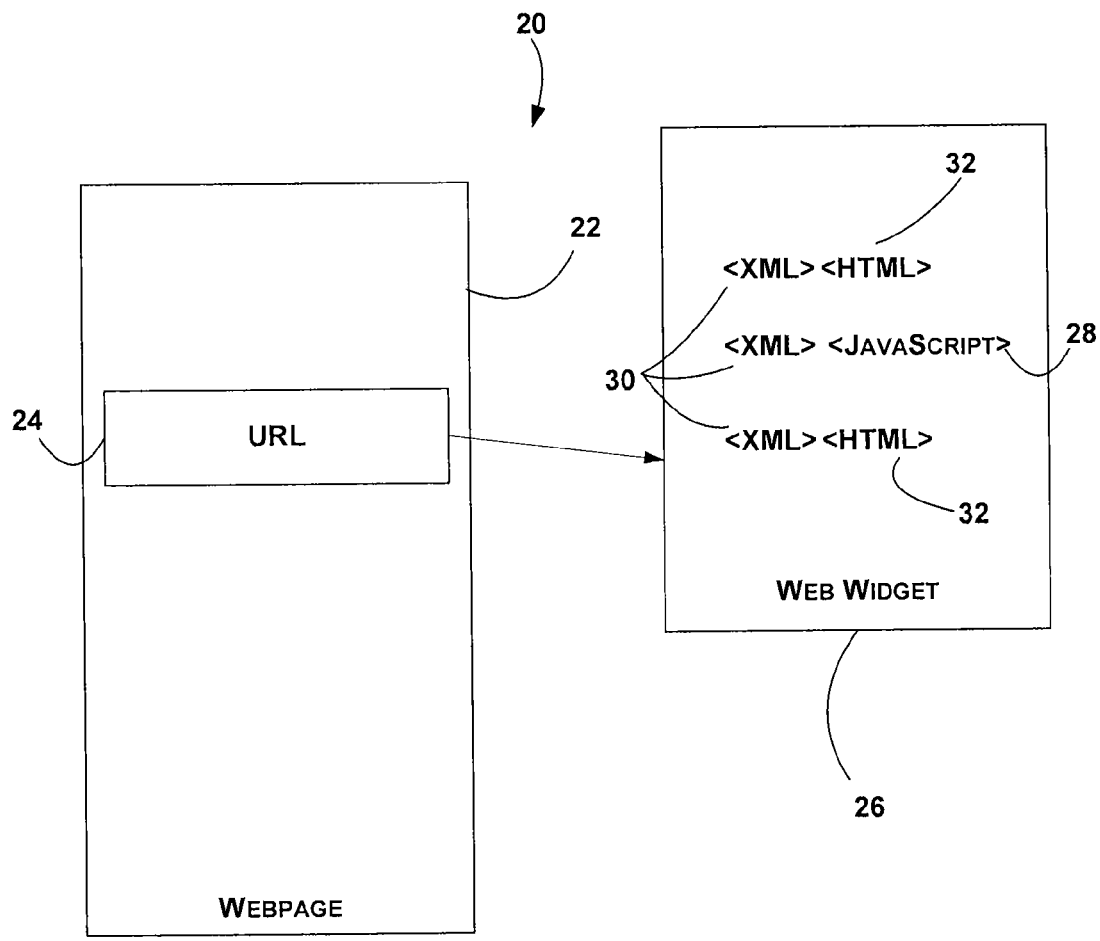
FIG. 1 is a block diagram representing a prior art web widget.

Referring now to the drawings, in which like reference numerals represent like parts throughout the several views, FIG. 1 shows a prior art web widget environment 20. The web widget environment 20 represents, for example, a Google Gadget web widget environment. Although some web widget environments may be different than shown, the basic components shown in FIG. 1 are believed to be present in most prior art web widget environments.

The web widget environment 20 includes a webpage 22 including a uniform resource locator (URL) 24 pointing to a web widget 26. The web widget 26 includes code, in the case of the Google Gadget, the code is JavaScript 28. The web widget 26 may include elements designated by, for example, XML tags 30. Some of the elements may include HTML to define a part of a page for the web widget 26.

In general, as the webpage 22 is parsed, the web widget 26 is accessed and executed as an embedded chunk of code. To add the web widget 20 to a webpage such as the webpage 22, a webpage designer embeds the URL 24 into the webpage.

As described in the background section of this document, one problem with the web widget environment 20 shown in FIG. 1 is that most users cannot embed a URL (such as the URL 24) into an existing webpage. The user may not have the knowledge or the skill to embed the URL into a webpage and/or may not have editing privileges for the webpage.

Figure 2:
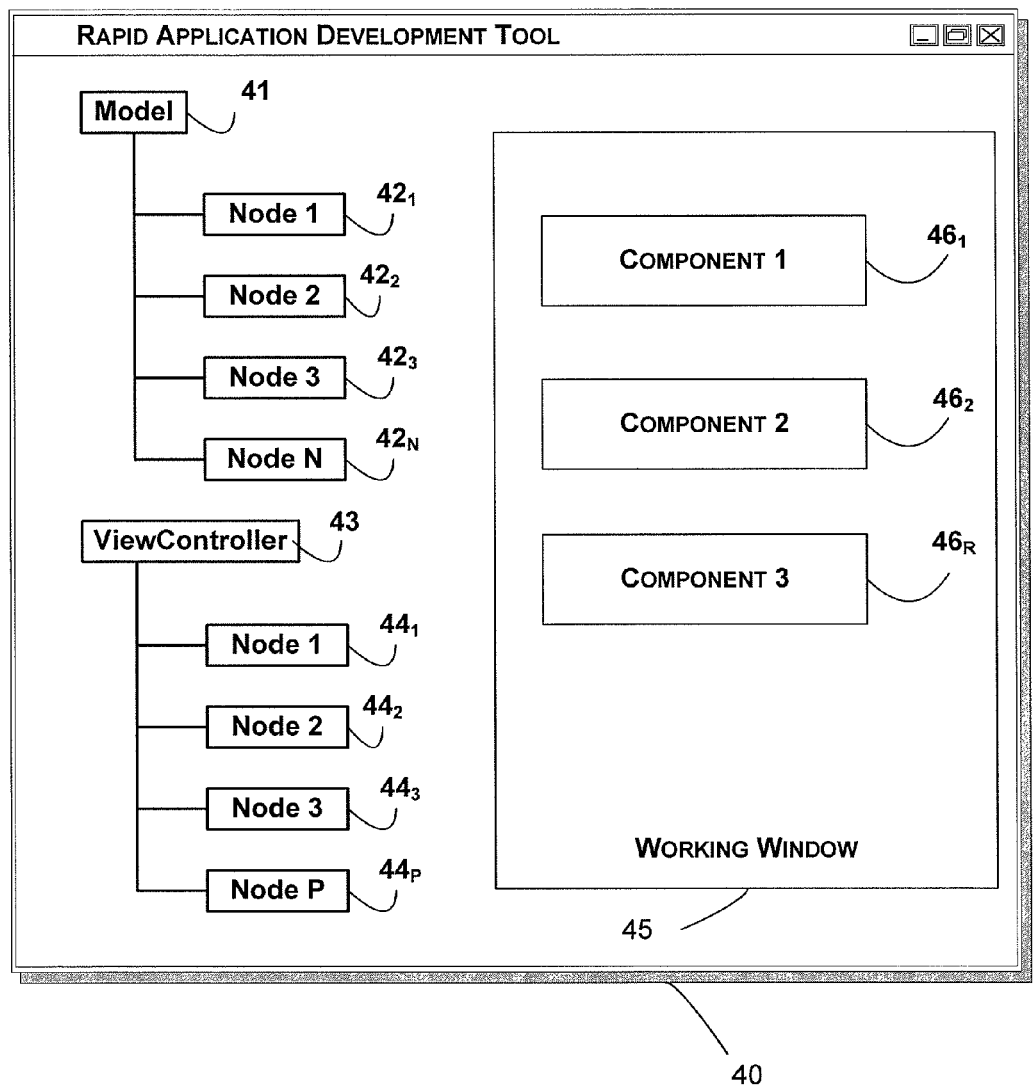
FIG. 2 is a block diagram representing components of a rapid application development tool in accordance with an embodiment.

In accordance with an embodiment, a web widget component is provided that permits a developer to add a user interface to an application or another user interaction environment. The web widget component may be utilized, for example, as a graphical user interface component of a rapid application development tool. Rapid application development tools, such as a rapid application development tool 40 shown in FIG. 2, are known. In general, rapid application development tools utilize web application frameworks or other types of software frameworks to speed application development. Prototypes or templates are provided as easily-added building blocks for user interface modules and other components of an application or another user interaction environment.

An example of a rapid application development tool is Oracle International Corporation's Application Development Framework, also called the "ORACLE ADF." ORACLE ADF is a commercial Java framework for creating enterprise applications and user interaction environments.

ORACLE ADF is based upon the model-view-controller architecture, which is well known and documented. This architecture isolates business logic (e.g., data) from user interface considerations, resulting in an application or user interaction environment where it is easier to modify either the visual appearance of the application or another user interaction environment or the underlying business rules without affecting the other. In the model-view-controller architecture, the model represents the information (the data) of the application and the business rules used to manipulate that data, the view corresponds to the elements of the user interface such as text, check box items, and so forth, and the controller manages details involving the communication to the model of user actions such as keystrokes and mouse movements.

Figure 5:
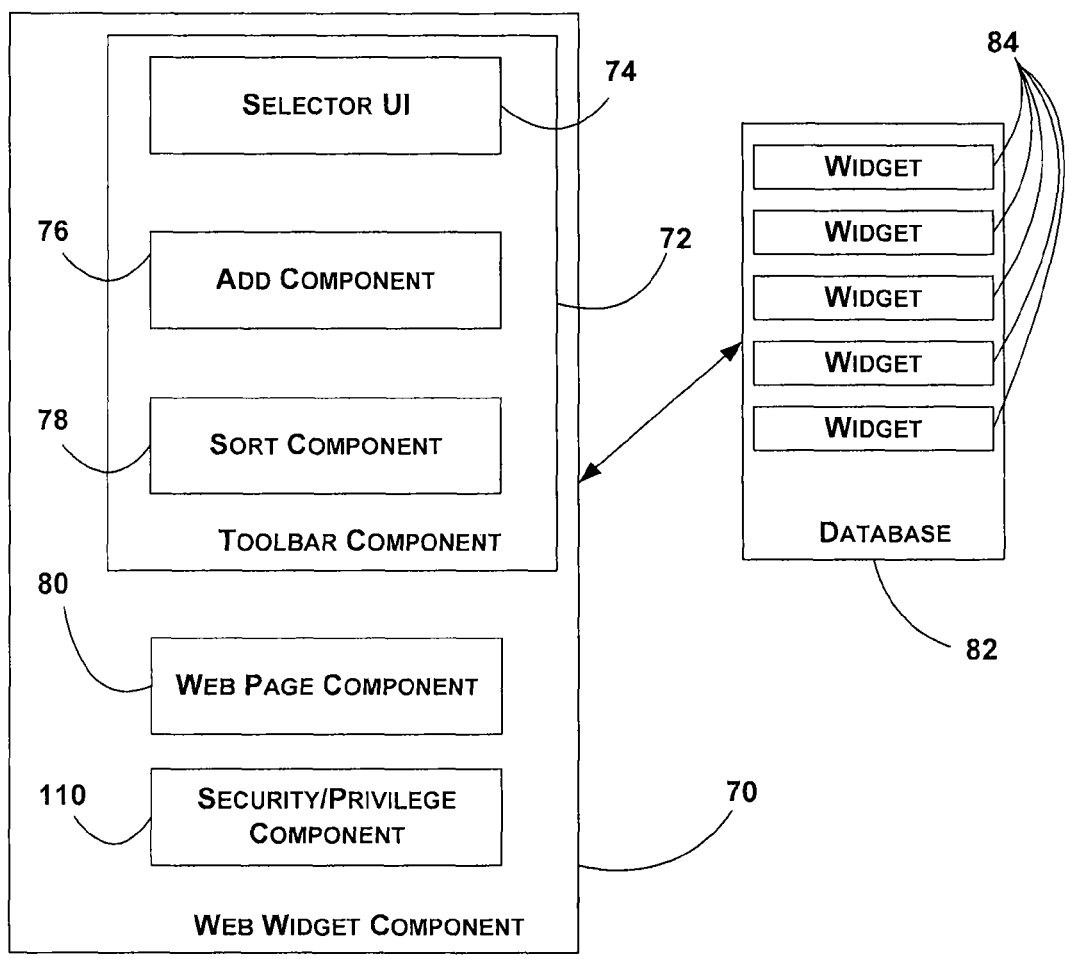
FIG. 5 is a block diagram representing components for a web widget component in accordance with an embodiment.
Figure 6:
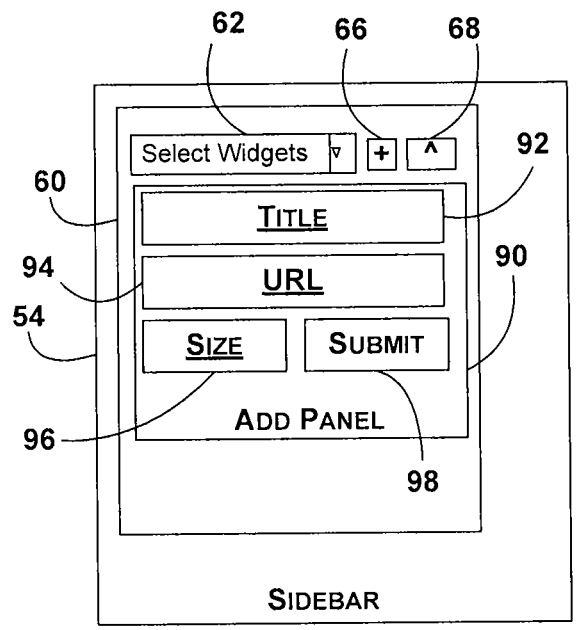
FIG. 6 is a representation of the user interface of FIG. 4, showing an add panel in accordance with an embodiment.

The rapid application development tool 40 shown in FIG. 2 is a simplified representation of the user interface for ORACLE ADF. The rapid application development tool 40 includes a model tree 41 having nodes 42 representing data for use in creating a user interaction environment, such as a user interaction environment 50 (FIG. 5). The user interaction environment 50 may be, for example, an application or a suite of user interactive interfaces.

The rapid application development tool 40 also includes a view controller tree 43, which includes both the view and controller features of the model-view-controller architecture. Again, like the model tree 41, the view controller tree 43 includes nodes 44 that may be utilized for creating a user interaction environment 50.

The developer utilizes tools provided by the rapid application development tool 40 to create components 46 utilizing the model tree nodes 42 and the view controller nodes 44. The model tree nodes 42 and the view controller nodes 44 are bound during this process. Nodes 42, 44 may be selected for use via a wizard or other tool, or may be implemented using drag and drop or other methods. Each component may include several different options for display or function.

The components 46 may be utilized in development of an application or another user interaction environment 50. The user interaction environment 50 and/or the components 46 are typically created within the working window 45. The components 46 may be added, for example, via a wizard, using drag and drop methods, or utilizing other methods. During development of the components 46, a developer may utilize a design view, in which components 46 are viewable as user interface modules, or a source view in which the source code for the components is viewable and editable.

Although ORACLE ADF is provided as an example, the widget host container component described herein may be utilized in other rapid application development tool environments. However, for ease of description, the example herein involves use of ORACLE ADF.

One of the components, for example the component $46_1$, of ORACLE ADF is a task flow component. A task flow is a ORACLE ADF component in which a developer defines an application task. The definition of the task includes the pages and logic that interact to allow the task flow to complete the task. At design time, the pages and page fragments that make up a task are added to a task flow as activities; in the cases of pages and page fragments they are view activities. So, when users navigate from one page to another within a task flow, they are transitioning from one activity to another. Activities can be considered the building blocks of the task flows. There are other activities besides view activities. ORACLE ADF task flows are well known and documented, so their structures are not described in detail here.

Figure 3:
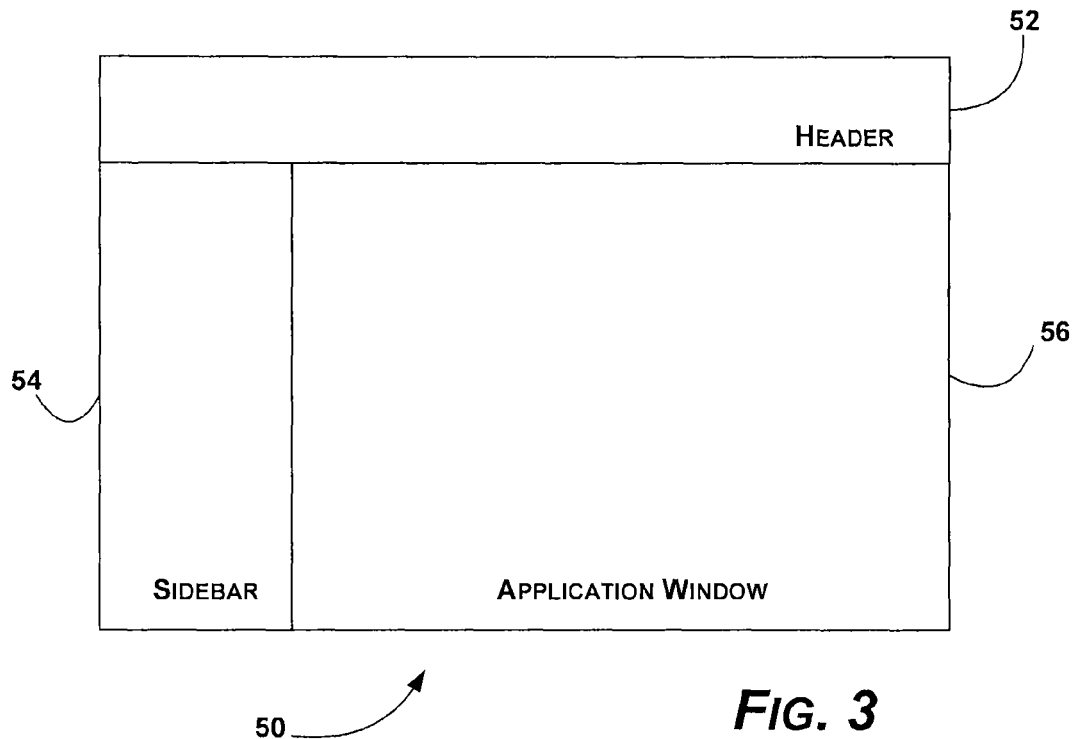
FIG. 3 is a representation of a user interaction environment created by the rapid application development tool of FIG. 2 in accordance with an embodiment.

FIG. 3 shows an example of a user interaction environment 50 developed by the rapid application development tool 40. The user interaction environment 50 in the example shown in the figure includes a header 52, a sidebar 54, and an application window 56. Each of these regions of the user interaction environment 50 may be formed by the rapid application development tool 40. The user interaction environment 50 is a suite of interactive applications, and serves as the screen view provided to each of the users on a network. The application window 56 hosts a current application used by a user. The sidebar 54 may include a collection of the components 46, and the header 52 may include a collection of components and/or links. The application window 56 may include one or more of the components 46. The user interaction environment 50 is but one example of a layout of a user interaction environment that may be provided by the rapid application development tool 40.

In embodiments, a web widget component may be utilized in any of the regions of the user interaction environment 50, including the header 52 and the sidebar 54, or specific regions within each of these areas. For example, for an embodiment where a task flow is utilized, the task flow may be placed in an upper portion of the sidebar 54 of the user interaction environment 50.

Figure 4:
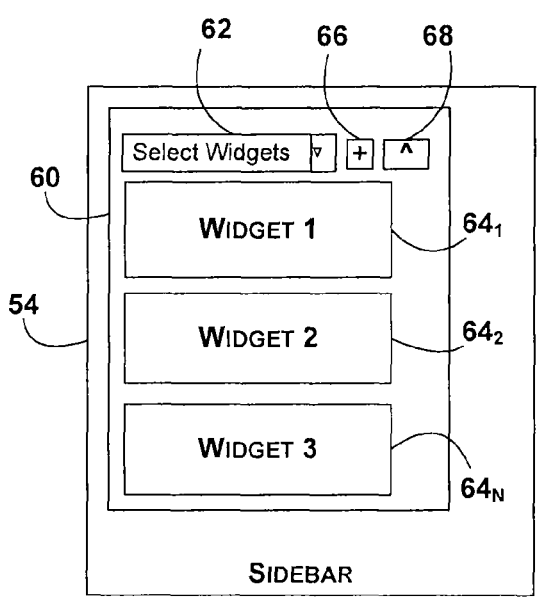
FIG. 4 is a representation of a user interface for a web widget component in accordance with an embodiment.

In accordance with an embodiment, as shown in FIG. 4, the sidebar 54 includes a web widget user interface component 60 having a drop-down menu 62 and several web widgets 64 displayed. The drop-down menu 62 permits a user to select one or more desktop widgets 64 for display. The web widget user interface component 60 also includes an add icon 66 and a sort icon 68. The function of these two icons is described below.

The web widget component 60 may be one of the components of the rapid application development tool 40 shown in FIG. 2, for example, the component 46. In an embodiment, the web widget component 60 is formed from a task flow, such as is described above.

FIG. 5 shows a block diagram representing components of the web widget component 60 in accordance with an embodiment. In the embodiment shown in the drawings, the web widget component 60 includes a toolbar component 72 having a selector user interface 74, an add component 76, and a sort component 78. The web widget component 60 also includes a web page component 80.

As stated above, the web widget component 60 may be built in a task flow, but other structures may be used for building of the web widget component. In an embodiment, however, regardless of the component used to build the web widget component 60, a web page component 80 of the web widget component permits the embedding of URLs for web widgets. The web page component 80 may be, for example, a browser control or any other component that is capable of the embedding function.

In use, a number of web widgets are associated with the web widget component 60. Information about these web widgets, such as the URLs of the web widgets 84, may be stored in a database 82 that is associated with the web widget component. This database 82 may be a part of the web widget component 60, or may be stored independent of the web widget component. The selector user interface 74 permits a user to select which web widgets 84 are to be displayed in the user interface 60. In an embodiment, the selector user interface is the dropdown menu 62, but other selection devices may be provided.

As an example, the selection user interface may make all available web widgets 84 in the database 82 viewable on the dropdown menu 62. A user may select one or more of these web widgets 84, for example, by checking boxes adjacent to the web widgets. Selected web widgets 84 are imbedded in the web page component 80 and are displayed as widgets 64 in the user interface 60 upon refresh of the side bar 54.

If desired, a user may select (e.g., by clicking on) the add icon 66 to open a add panel 90. This add panel 90 permits a user to add a new web widget 84 to the web widget component 60. In the embodiment shown in the drawings, the add panel 90 includes a title data field 92, a URL data field 94 and a size data field 96. The title data field 92 permits a user to provide a name for a particular web widget. The URL data field 96 permits entry of the URL for the particular web widget. If desired, a check feature may be provided for confirming that the URL links to a web widget. The size data field 96 permits a user to define the width of a web widget. This feature is important, because many web widgets have a standard width which may not fit within the particular component in which the user interface 60 is installed. For example, Google gadgets have a width of 320 pixels, wherein a standard side bar 54 for ORACLE ADF is 220 pixels. Thus, a user may define the width as 220 pixels, and the web widget will fit within the particular window. If desired, a selection such as "fit-to-width" may be provided. After information is entered into the add panel 90, a user may select a submit button 98, and the web widget may be added to the database 82.

Figure 7:
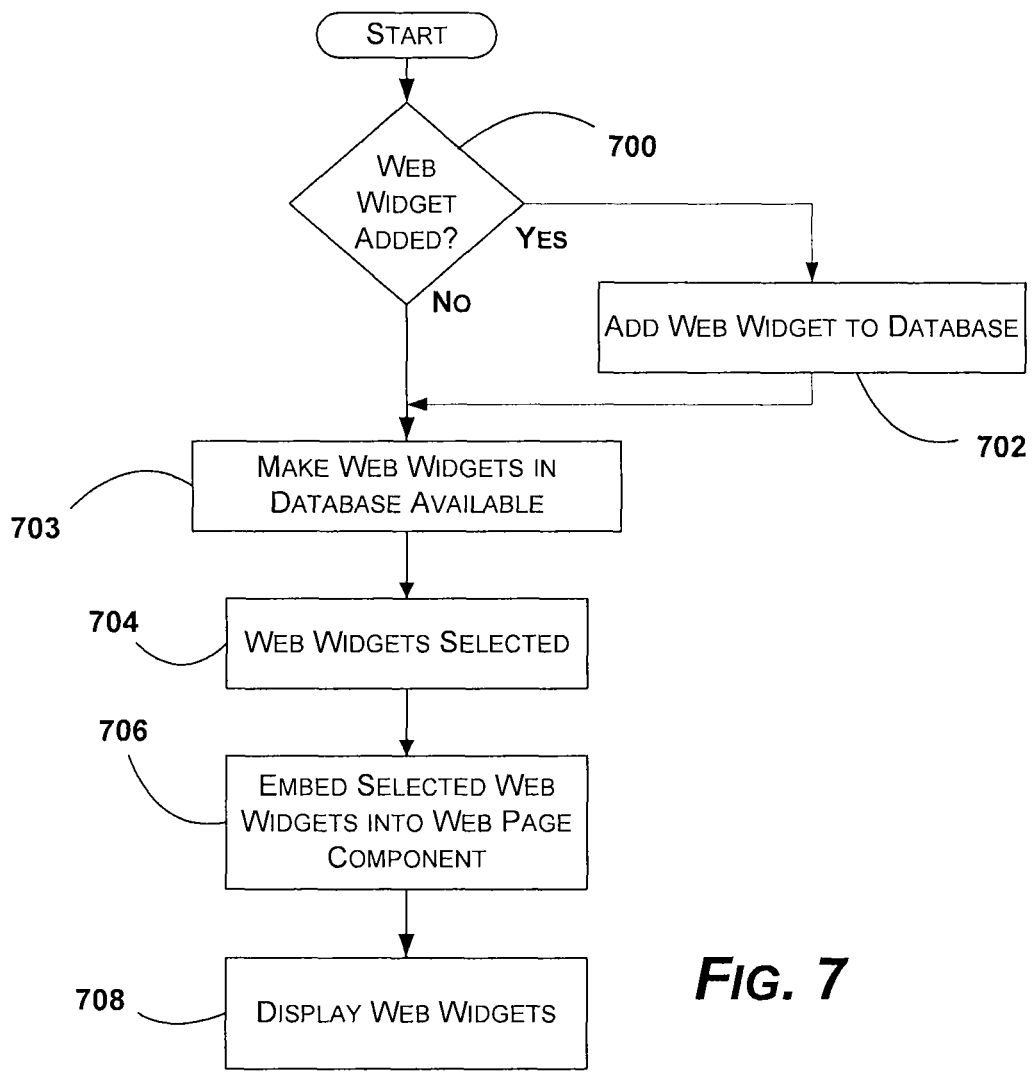
FIG. 7 is a flow chart representing steps for building the user interface of FIG. 4 with the web widget component of FIG. 5 in accordance with an embodiment.

FIG. 7 shows a flow chart representing steps for generating a display of web widgets, such as the display of web widgets 64 as shown in FIG. 4, in accordance with an embodiment. Beginning at step 700, a determination is made whether a web widget has been added, for example, via the add panel 90. If so, step 700 branches to step 702, where the web widget is added to the database 82. If desired, a developer or administrator may pre-seed one or more web widgets 84 into the database, with these web widgets being available via the drop down menu 62 upon use. Alternatively, an administrator may require adding all web widgets via the add panel 90 or other tool. In either event, additional web widgets may be added via the add panel 90. If desired, a removal feature may be provided as well.

At step 703, the web widgets in the database 82 are made available for selection, for example by populating the web widgets into the drop down menu 62. At step 704, the web widgets for display are selected, for example, by checking the desired web widgets in the drop down menu 62. At step 706, the selected web widgets are embedded into the web page component 80. At step 708, the web widgets that were embedded into the web page component are displayed, for example, in the user interface 60.

If desired, a sort feature may be provided for the web widgets. This sort feature determines the order or arrangement of display, for example from top to bottom, of the web widgets within the user interface 60 and may be provided, for example, by the sort component 78.

Figure 8:
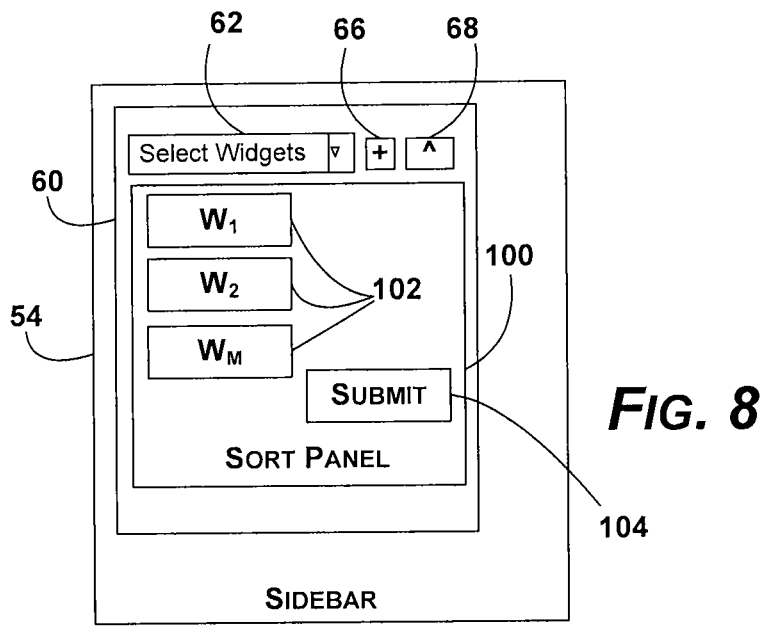
FIG. 8 is a representation of a user interface of FIG. 4, showing a sort panel in accordance with an embodiment.

In an embodiment, the sort component 78 is initiated using the sort icon 68. This sort icon 68 opens a sort panel 100 (FIG. 8) showing miniature representations 102 of the web widgets that have been selected for display. A user may rearrange these web widgets representations 102 in the sort panel 100 in a desired order and then select a submit button 104. Sort may be provided via drag and drop, up and down arrows or another user interface.

If desired, a security/privilege component 110 may be provided in the web widget component 60. The security/privilege component 110 permits an administrator to set privileges or security levels for web widgets, limiting the web widgets that may be available to particular users in accordance with their security and/or privilege. Thus, in this manner, only particular web widgets may be added via the add panel 90 and/or selected by the selector user interface 74. In another embodiment, the add panel 90 is not provided, and a particular set of web widgets are made available in the database 82.

The web widget component 60 provides a structure for declaratively adding web widgets to an application or another user interaction environment. A developer utilizing the rapid application development tool 40 may add the web widget component 60 to an application or other user interaction environment and users of the user interaction environment may declaratively select and display a set of web widgets.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer system comprising:
   one or more processors; and
   memory including executable instructions that, when executed collectively by the one or more processors, cause the computer system to implement at least:
   a web widget component of a rapid application development tool that is managed by a developer and configured to host a plurality of web widgets in a user interaction environment presented to a user, the plurality of web widgets available for use within an enterprise application of the user, a first subset of the hosted plurality of web widgets being configured to be selected by the developer for inclusion in the enterprise application of the user using the user interaction environment presented to the user, the user interaction environment developed using a framework of the rapid application development tool, the first subset of the hosted plurality of web widgets limited by a security clearance of the user, a second subset of web widgets of the first subset selected by the developer from the first subset based at least in part on the security clearance of the user, the web widget component comprising:
      a web page component configured for embedding at least the first subset of the plurality of web widgets into the enterprise application using the user interaction environment developed by the developer using the rapid application development tool;
      a selector component configured to enable the user to select at least one web widget from the second subset of web widgets selected by the developer for embedding in the enterprise application; and
      a display component configured to display at least one web widget of the second subset of web widgets to the user.

2. The computer system of claim 1, wherein the selector component comprises a drop-down menu.

3. The computer system of claim 2, wherein the web widget component further comprises an add component for adding web widgets.

4. The computer system of claim 3, wherein the add component adds the web widgets for selection by the selector component.

5. The computer system of claim 3, wherein the web widget component further comprises a security component for setting web widgets that may be added by the add component.

6. The computer system of claim 1, wherein the web widget component further comprises a security component for setting web widgets that may be selected by the selector component.

7. The computer system of claim 1, wherein the web widget component further comprises a sort component for setting a sort arrangement of said at least one web widget.

8. The computer system of claim 1, wherein the web widget component is configured to be installed in the user interaction environment by the rapid application development tool.

9. The computer system of claim 1, wherein the web widget component further comprises a database component, the database component storing URLs of a plurality of web widgets that are associated with the web widget component.

10. The computer system of claim 1, wherein the rapid application development tool is based on model-view-controller architecture.

11. A non-transitory computer-readable medium including computer-executable instructions, comprising:
    code for implementing a web widget component of a rapid application development tool that is managed by a developer and configured to host a plurality of web widgets in a user interaction environment presented to a user, the plurality of web widgets available for use within an enterprise application of the user, a first subset of the hosted plurality of web widgets being configured to be selected by the developer for inclusion in the enterprise application of the user using the user interaction environment presented to the user, the user interaction environment developed using a framework of the rapid application development tool, the first subset of the hosted plurality of web widgets limited by a security clearance of the user, a second subset of web widgets of the first subset selected by the developer from the first subset based at least in part on the security clearance of the user, the web widget component comprising:
      a web page component configured for embedding at least the first subset of the plurality of web widgets into the enterprise application using the user interaction environment developed by the developer using the rapid application development tool;
      a selector component configured to enable the user to select the at least one web widget from the second subset of web widgets selected by the developer for embedding in the enterprise application; and
      a display component configured to display at least one web widget of the second subset of web widgets to the user.

12. The non-transitory computer-readable medium of claim 11, wherein the selector component comprises a drop-down menu.

13. The non-transitory computer-readable medium of claim 12, wherein the web widget component further comprises a security component for setting web widgets that may be selected by the selector component.

14. The non-transitory computer-readable medium of claim 11, wherein the web widget component comprises an add component for adding web widgets.

15. The non-transitory computer-readable medium of claim 14, wherein the web widget component further comprises a security component for setting web widgets that may be added by the add component.

16. The non-transitory computer-readable medium of claim 11, wherein the web widget component further comprises a sort component for setting a sort arrangement of the web widget.

* * * * *